United States Patent
Campbell et al.

(10) Patent No.: US 9,874,297 B2
(45) Date of Patent: Jan. 23, 2018

(54) PIPE/CONDUIT HANGING DEVICE

(71) Applicants: Curtis Robert Campbell, Austin, TX (US); Suzanna Christina Ramos, Austin, TX (US)

(72) Inventors: Curtis Robert Campbell, Austin, TX (US); Suzanna Christina Ramos, Austin, TX (US)

( * ) Notice: Subject to any disclaimer, the term of this patent is extended or adjusted under 35 U.S.C. 154(b) by 0 days.

(21) Appl. No.: 14/904,903

(22) PCT Filed: Jul. 14, 2014

(86) PCT No.: PCT/US2014/046481
§ 371 (c)(1),
(2) Date: Jan. 13, 2016

(87) PCT Pub. No.: WO2015/020757
PCT Pub. Date: Feb. 12, 2015

(65) Prior Publication Data
US 2016/0146377 A1    May 26, 2016

Related U.S. Application Data

(60) Provisional application No. 61/846,514, filed on Jul. 15, 2013.

(51) Int. Cl.
| E04B 1/00 | (2006.01) |
| F16L 3/22 | (2006.01) |
| F16L 3/10 | (2006.01) |
| F16L 3/11 | (2006.01) |
| F16B 2/06 | (2006.01) |

(52) U.S. Cl.
CPC .............. *F16L 3/221* (2013.01); *F16B 2/065* (2013.01); *F16L 3/1075* (2013.01); *F16L 3/11* (2013.01)

(58) Field of Classification Search
CPC . F16L 3/221; F16L 3/11; F16L 3/1075; F16B 2/065
USPC .......................... 52/745.21; 248/62, 58, 68.1
See application file for complete search history.

(56) References Cited

U.S. PATENT DOCUMENTS

| 1,805,006 A | * | 5/1931 | Neilon | ................... F16L 3/1075 |
| | | | | 248/62 |
| 2,616,645 A | * | 11/1952 | Kindorf | .................... F16L 3/11 |
| | | | | 248/62 |
| 3,023,989 A | * | 3/1962 | White | ................... F16L 3/2235 |
| | | | | 174/135 |

(Continued)

*Primary Examiner* — Basil Katcheves

(57) ABSTRACT

Disclosed herein is an apparatus, system and method for hanging one or more pipes or conduits from a single threaded rod. The Pipe/Conduit Hanging Device comprises an unthreaded rod coupling, with one or more pipe clamps distending therefrom, which may be slidably adjusted along a threaded rod and held in place by a pair of nuts. The Pipe/Conduit Hanging Device may be used individually or in a system comprising multiple Pipe/Conduit Hanging Devices working in conjunction. The most preferred embodiment comprises a split-ring type clamp distending from an unthreaded rod coupling with a sliding cavity that is marginally larger in diameter than the diameter of a threaded rod, so that a threaded rod may easily slide through the sliding cavity while the device is being installed. Further, a method of using a "C" clamp to allow a Pipe/Conduit Hanging Device to span a gap between two threaded rods is disclosed.

15 Claims, 15 Drawing Sheets

(56) References Cited

U.S. PATENT DOCUMENTS

| | | | | | |
|---|---|---|---|---|---|
| 3,866,871 | A | * | 2/1975 | Dupuy, Sr. | F16L 3/2235 248/59 |
| 4,245,806 | A | * | 1/1981 | Vangreen | F16L 3/133 248/59 |
| 4,524,936 | A | * | 6/1985 | Hurtubise | F16L 3/133 248/62 |
| 4,765,577 | A | * | 8/1988 | Collins | F16L 59/135 138/107 |
| 5,102,074 | A | * | 4/1992 | Okada | F16L 3/24 248/59 |
| 5,181,774 | A | * | 1/1993 | Lane | B62J 6/02 224/421 |
| 5,188,317 | A | * | 2/1993 | Roth | H02G 3/26 248/59 |
| 6,471,171 | B1 | * | 10/2002 | VanderVelde | H02G 3/32 248/229.12 |
| 6,483,026 | B1 | * | 11/2002 | Snider, Jr. | H02G 3/0456 174/496 |
| 7,325,776 | B2 | * | 2/2008 | Shibuya | F16L 3/1016 24/284 |
| 7,484,697 | B1 | * | 2/2009 | Nelson | F16L 3/24 248/58 |
| 7,871,045 | B2 | * | 1/2011 | Moore | F16M 13/027 248/188.1 |
| 9,091,372 | B2 | * | 7/2015 | Lacour | F16L 3/133 |
| 2014/0367530 | A1 | * | 12/2014 | Radzik | F16L 3/1083 248/72 |

\* cited by examiner

PIPE/CONDUIT HANGING DEVICE

CROSS-REFERENCE TO RELATED APPLICATIONS

This application claims benefit of U.S. Provisional Patent Application No. 61/846,514, which was filed on Jul. 15, 2013, and which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of plumbing devices. More particularly, the preferred embodiments of the present invention of plumbing devices used to hang pipe or conduit. More particularly, the preferred embodiments of the present invention of plumbing devices used to hang pipe or conduit from threaded rods. More particularly, the preferred embodiments of the present invention relate generally to an apparatus, system and method, which comprises an unthreaded rod coupling with one or more pipe clamps distending from the unthreaded rod coupling, which may be slidably adjusted along a threaded rod and held in place by a pair of nuts.

2. Description of the Related Art

Commercial construction, especially commercial construction of large buildings, requires hanging pipes or conduits in order to install a plumbing system. The broad concept of systems that use apparatuses for hanging pipes or conduits is known. These inventions usually involve using trapeze hangers to support pipes or conduits horizontally. A trapeze hanger is a support assembly consisting of two parallel vertical rods, which are suspended from a structure and connected at their lower ends by a horizontal member from which the pipe is supported. Often in commercial construction, there is no concrete decking, or other appropriate surface, to insert sleeve type anchors that are necessary to accommodate the two rods of the trapeze hanger. In these situations, an installer is required to span a strut channel between steel beams, usually with five-foot centers, and then suspend the trapeze hanger from the strut channel. Many building codes require support every five feet depending on the type of pipe or conduit that is being run. These situations commonly result in an extreme amount of material and labor to simply run two or more line the distance needed, creating a problem for the construction industry.

It is also known to use pipe clamps to support a pipe or conduit; however, these pipe clamps are usually permanently affixed or welded in place and may not be easily adjusted along a threaded rod.

General definitions for terms utilized in the pertinent art are set forth below.

A trapeze hanger is a support assembly consisting of parallel vertical rods, which are suspended from a structure and connected at their lower ends by a horizontal member from which the pipe is supported.

A strut channel is a standardized formed structural system used in the construction and electrical industries for light structural support, often for supporting wiring, plumbing, or mechanical components.

A threaded rod is a relatively long rod with threads that extend along the complete length of the rod.

SUMMARY OF THE INVENTION

The broad embodiments of the present invention relates generally to an apparatus, system and method for hanging one or more pipes or conduits from a single threaded rod. In broad embodiment, the Pipe/Conduit Hanging Device comprises an unthreaded rod coupling with one or more pipe clamps distending from the unthreaded rod coupling, which may be slidably adjusted along a threaded rod and held in place by a pair of nuts. The Pipe/Conduit Hanging Device may be used individually or in a system comprising multiple Pipe/Conduit Hanging Devices working in conjunction.

In the most preferred embodiments, the present invention relates to an apparatus, system and method for hanging one or more pipes or conduits from a single threaded rod. The most preferred embodiment is a Pipe/Conduit Hanging Device, which comprises a split-ring type clamp distending from an unthreaded rod coupling. The split-ring type clamp comprises a clamp base and a clamp arm, which are hinged together with a rivet that allows the clamp arm to swing away from the clamp base. A screw allows the clamp arm to be firmly secured to the clamp base. The unthreaded rod coupling comprises a body with a sliding cavity, which is marginally larger in diameter than the diameter of a threaded rod, so that a threaded rod may easily slide through the sliding cavity while the Pipe/Conduit Hanging Device is being installed. The clamp base of the split-ring clamp is permanently affixed to the body of the unthreaded rod coupling as a singular construction, allowing the split-ring clamp to distend from the unthreaded rod coupling. (The split-ring clamp can be mounted to the body of the unthreaded rod coupling at any desired angle or by using a pivoting attachment point with a lock screw.) The method and system of using the most preferred embodiment of a Pipe/Conduit Hanging Device comprises suspending a threaded rod into the location where a pipe will be hung; threading a nut onto the threaded rod and adjusting it to the appropriate height just above the location where the Pipe/Conduit Hanging Device will be installed; sliding the unthreaded rod coupling of the Pipe/Conduit Hanging Device onto the threaded rod with the threaded rod loosely, but securely, fitting through the sliding cavity; threading a second nut onto the threaded rod; adjusting the second nut to firmly secure the Pipe/Conduit Hanging Device between the two nuts with the split-ring clamp in the appropriate position to receive a pipe for hanging (the precise location of the Pipe/Conduit Hanging device may be adjusted by adjusting the nuts, between which the Pipe/Conduit Hanging Device is sandwiched); removing the screw from the clamp base to allow the split-ring clamp of the Pipe/Conduit Hanging Device to be opened; positioning a pipe to be hung in the opening between the clamp base and the clamp arm; closing the clamp arm; reinserting the screw into the clamp base and firmly securing the clamp arm to the clamp base by tightening the screw. Additional Pipe/Conduit Hanging Devices may then be added to the threaded rod and secured in place with additional nuts in order to hang multiple pipes or conduits from the same single threaded rod. The Pipe/Conduit Hanging Devices may be installed in a configuration in which the pipes or conduits are on different sides of the threaded rod, or the Pipe/Conduit Hanging Devices may be installed in a configuration in which the pipes are on the same side of the threaded rod. The Pipe/Conduit Hanging Devices may also be installed in order to facilitate hanging a pipe at any angle around the threaded rod. Although the most preferred embodiment describes a split-ring type pipe clamp, any type of clamp may distend from the unthreaded rod coupling.

In another preferred embodiment, the present invention relates to an apparatus, system and method for hanging one or more pipes or conduits vertically from a single vertical threaded rod. This preferred embodiment is a Vertical Pipe/Conduit Hanging Device, which comprises a perpendicular split-ring type clamp distending from an unthreaded rod coupling. The perpendicular split-ring type clamp comprises a clamp base and a clamp arm, which are hinged together with a rivet that allows the clamp arm to swing away from the clamp base. A screw allows the clamp arm to be firmly secured to the clamp base. The unthreaded rod coupling comprises a body with a sliding cavity, which is marginally larger in diameter than the diameter of a threaded rod, so that a threaded rod may easily slide through the sliding cavity while the Vertical Pipe/Conduit Hanging Device is being installed. The clamp base of the perpendicular split-ring clamp is permanently affixed to the body of the unthreaded rod coupling as a singular construction, allowing the split-ring clamp to distend from the unthreaded rod coupling. (The perpendicular split-ring clamp can also be mounted to the body of the unthreaded rod coupling at any desired angle or by using a pivoting attachment point with a lock screw.) The method and system of using this preferred embodiment of a Vertical Pipe/Conduit Hanging Device comprises suspending a threaded rod into the location where a pipe will be hung; threading a nut onto the threaded rod and adjusted it to the appropriate height just above the location where the Vertical Pipe/Conduit Hanging Device will be installed; sliding the unthreaded rod coupling of the Vertical Pipe/Conduit Hanging Device onto the threaded rod with the threaded rod loosely, but securely, fitting through the sliding cavity; threading a second nut onto the threaded rod; adjusting the second nut to firmly secure the Vertical Pipe/Conduit Hanging Device between the two nuts with the perpendicular split-ring clamp in the appropriate position to receive a pipe for vertical hanging (the precise location of the Vertical Pipe/Conduit Hanging device may be adjusted by adjusting the nuts, between which the Vertical Pipe/Conduit Hanging Device is sandwiched); removing the screw from the clamp base to allow the perpendicular split-ring clamp of the Vertical Pipe/Conduit Hanging Device to be opened; positioning a pipe to be vertically hung in the opening between the clamp base and the clamp arm; closing the clamp arm; reinserting the screw into the clamp base and firmly securing the clamp arm to the clamp base by tightening the screw. Additional Vertical Pipe/Conduit Hanging Devices may then be added to the threaded rod and secured in place with additional nuts in order to hang multiple pipes or conduits from the same single threaded rod. The Vertical Pipe/Conduit Hanging Devices may also be installed in order to facilitate hanging a pipe at any angle around the threaded rod. Although this preferred embodiment describes a split-ring type pipe clamp, any type of clamp may distend from the unthreaded rod coupling.

In another preferred embodiment, the present invention relates to an apparatus, system and method for hanging two pipes from a single vertical threaded rod. This preferred embodiment is a Double Pipe/Conduit Hanging Device, which comprises two split-ring type clamp distending from opposite sides of an unthreaded rod coupling. The two split-ring type clamps comprise a clamp base and a clamp arm, which are hinged together with a rivet that allows the clamp arm to swing away from the clamp base. Screws allow the clamp arms to be firmly secured to the clamp bases. The unthreaded rod coupling comprises a body with a sliding cavity, which is marginally larger in diameter than the diameter of a threaded rod, so that a threaded rod may easily slide through the sliding cavity while the Double Pipe/Conduit Hanging Device is being installed. The clamp bases of the split-ring clamps are permanently affixed to the body of the unthreaded rod coupling on opposite sides of the unthreaded rod coupling as a singular construction. (A plurality of split-ring clamps can also be mounted to the body of the unthreaded rod coupling at any desired angle, or by using a pivoting attachment point with a lock screw, as practicable.) The method and system of using this preferred embodiment of a Double Pipe/Conduit Hanging Device comprises suspending a threaded rod into the location where the two pipes will be hung; threading a nut onto the threaded rod and adjusted it to the appropriate height just above the location where the Double Pipe/Conduit Hanging Device will be installed; sliding the unthreaded rod coupling of the Double Pipe/Conduit Hanging Device onto the threaded rod with the threaded rod loosely, but securely, fitting through the sliding cavity; threading a second nut onto the threaded rod; adjusting the second nut to firmly secure the Double Pipe/Conduit Hanging Device between the two nuts with the split-ring clamps in the appropriate position to receive the two pipe for hanging (the precise location of the Double Pipe/Conduit Hanging device may be adjusted by adjusting the nuts, between which the Double Pipe/Conduit Hanging Device is sandwiched); removing the screws from the clamp bases to allow the split-ring clamps of the Double Pipe/Conduit Hanging Device to be opened; positioning the two pipes to be hung in the openings between the clamp bases and the clamp arms; closing the clamp arms; reinserting the screws into the clamp bases and firmly securing the clamp arms to the clamp bases by tightening the screws. Additional Double Pipe/Conduit Hanging Devices may then be added to the threaded rod and secured in place with additional nuts in order to hang multiple pairs of pipes or conduits from the same single threaded rod. The Double Pipe/Conduit Hanging Devices may also be installed in order to facilitate hanging a pipe at any angle around the threaded rod. Although this preferred embodiment describes a pair of split-ring type pipe clamps, any type of clamps may distend from the unthreaded rod coupling.

All preferred embodiments of the present invention may be used in conjunction with a "C" Clamp, which allows a Pipe/Conduit Hanging Device to span a gap between two threaded rods. The "C" clamp comprises an upper "C" clamp head and a lower "C" clamp head, which both distend perpendicularly in the same direction from a "C" clamp body. The upper "C" clamp head and lower "C" clamp head further comprise a mounting gap, which securely fits around a threaded rod. The method and system of inserting a Pipe/Conduit Hanging Device onto an existing threaded rod comprises cutting the existing threaded rod 190, or a section of the existing threaded rod, at the location where the Pipe/Conduit Hanging Device will be inserted, creating an upper threaded rod and a lower threaded rod; threading a first nut onto the bottom of the upper threaded rod; fitting the mounting gap of the upper "C" clamp head over the upper threaded rod under the first nut; threading a second nut onto the bottom of the upper threaded rod and adjusting it so that it firmly abuts the bottom of the upper "C" clamp head, thereby securing the "C" clamp firmly to the upper threaded rod by sandwiching the upper "C" clamp head between the first and second nuts; fitting a Pipe/Conduit Hanging Device onto the upper threaded rod; threading a third nut and a fourth nut onto the top of the lower threaded rod; fitting the top of the lower threaded rod into the bottom of the Pipe/Conduit Hanging Device; fitting the mounting gap of the lower "C" clamp head of the "C" clamp over the lower threaded rod so that the lower "C" clamp head is sandwiched between the third and fourth nuts; and adjusting and tightening the nuts so that the Pipe/Conduit Hanging Device and "C" clamp assembly is firmly secured between the upper threaded rod and the lower threaded rod. Once the Pipe/Conduit Hanging Device and "C" clamp assembly is secured, a pipe or conduit may be hung through the pipe opening in the split-ring clamp of the Pipe/Conduit Hanging Device. Similarly, the method and system of adding an additional lower threaded rod below an upper threaded rod comprised threading a first nut onto the bottom of the upper threaded rod; fitting the mounting gap of the upper "C" clamp head over the upper threaded rod under the first nut; threading a second nut onto the bottom of the upper threaded rod and adjusting it so that it firmly abuts the bottom of the upper "C" clamp head, thereby securing the "C" clamp firmly to the upper threaded rod by sandwiching the upper "C" clamp head between the first and second nuts; fitting a Pipe/Conduit Hanging Device onto the upper threaded rod; threading a third nut and a fourth nut onto the top of the lower threaded rod, which is to be added under the upper threaded rod; fitting the top of the lower threaded rod into the bottom of the Pipe/Conduit Hanging Device; fitting the mounting gap of the lower "C" clamp head of the "C" clamp over the lower threaded rod so that the lower "C" clamp head is sandwiched between the third and fourth nuts; and adjusting and tightening the nuts so that the Pipe/Conduit Hanging Device and "C" clamp assembly is firmly secured between the upper threaded rod and the added lower threaded rod. Once the Pipe/Conduit Hanging Device and "C" clamp assembly is secured, a pipe or conduit may be hung through the pipe opening in the split-ring clamp of the Pipe/Conduit Hanging Device. Additional threaded rods may be added in series below the upper threaded rod as desired.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the most preferred embodiments of an apparatus for hanging one or more pipes or conduits, the apparatus generally comprising an unthreaded rod coupling joined with one or more split-ring type clamps. The split-ring clamp(s) may be joined to the unthreaded rod coupling in an appropriate orientation in order to hang a pipe or conduit at any desired angle; however, for the purposes of illustration, a horizontal embodiment and a vertical embodiment are shown. These embodiments are not intended to limit the scope of the present invention.

Figure 1:
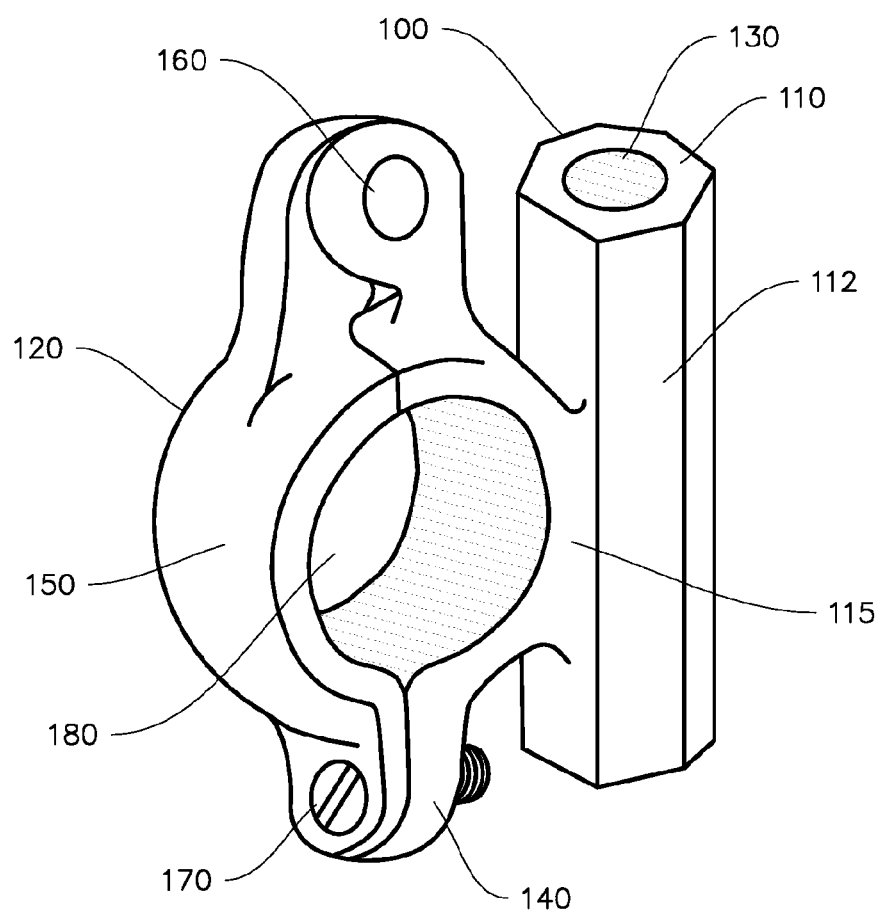
FIG. 1 is a perspective view of an apparatus of the present invention.
Figure 2:
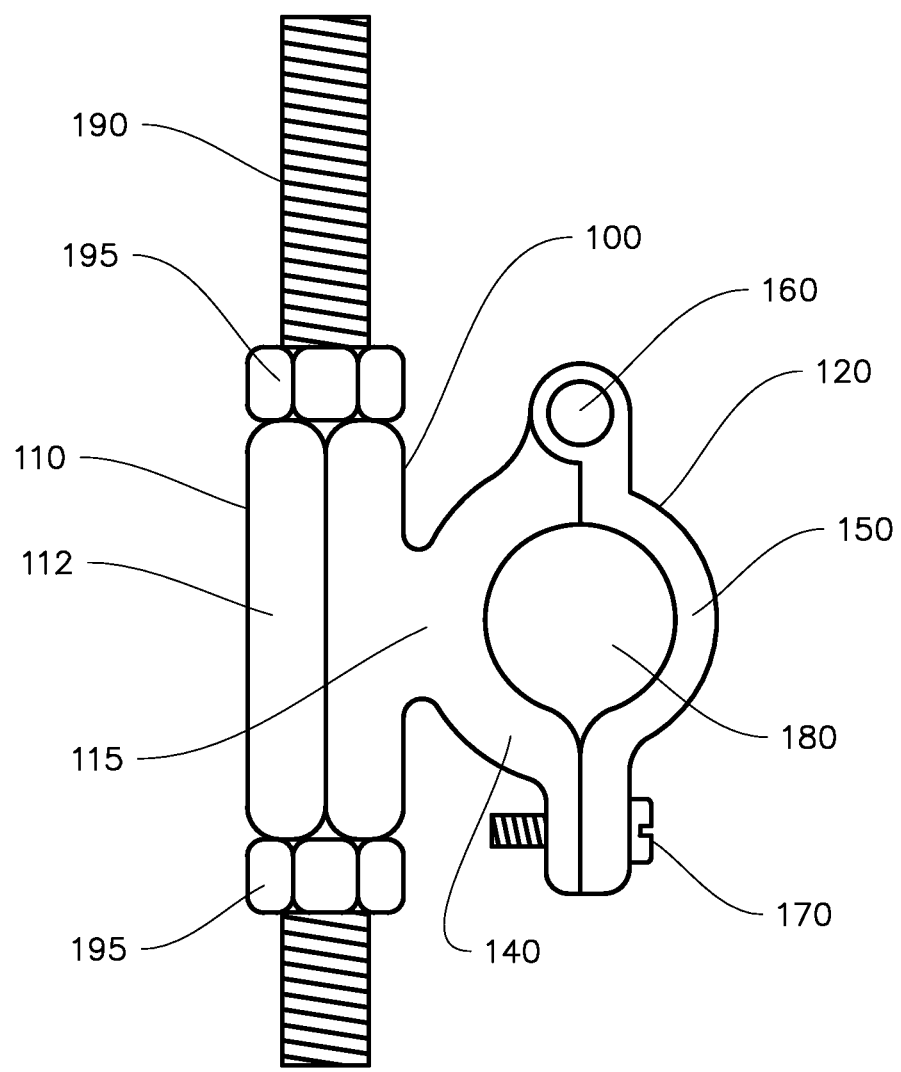
FIG. 2 is a front view of an apparatus of FIG. 1 mounted on a threaded rod.
Figure 3:
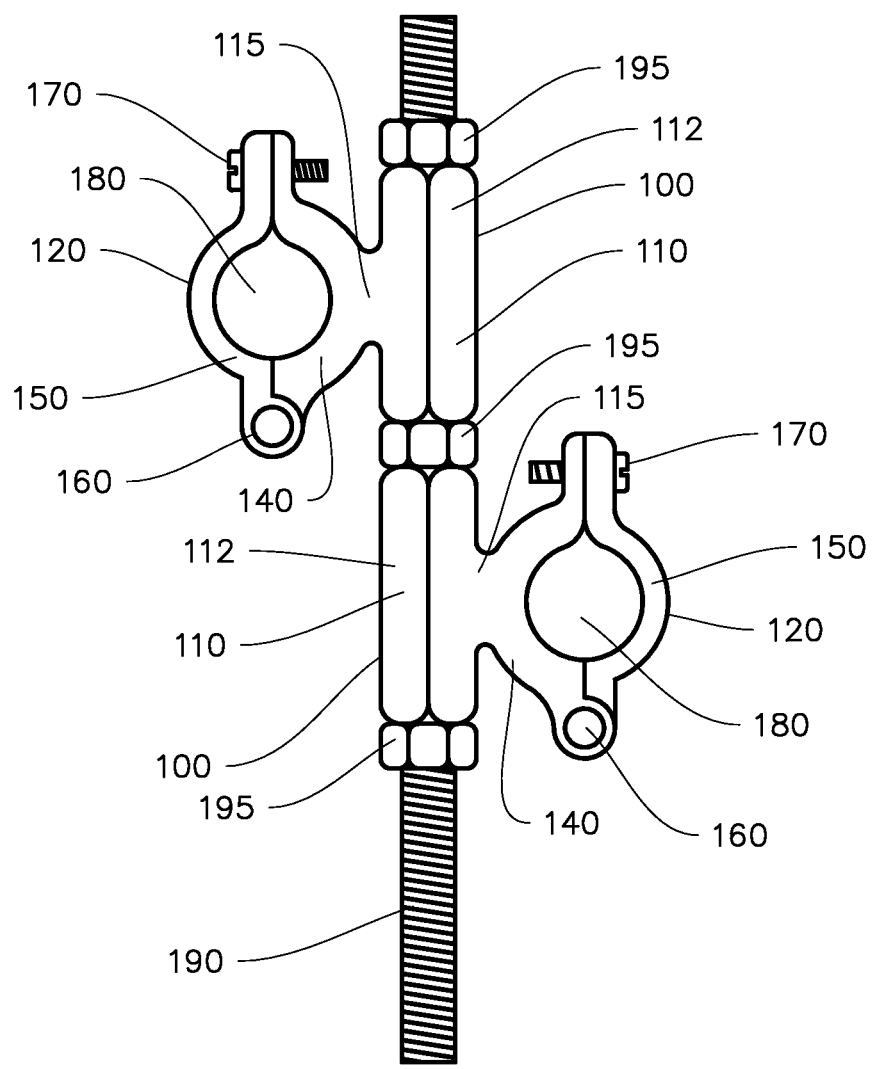
FIG. 3 is a front view and a rear view of two apparatuses of FIG. 1 mounted on a threaded rod.
Figure 4:
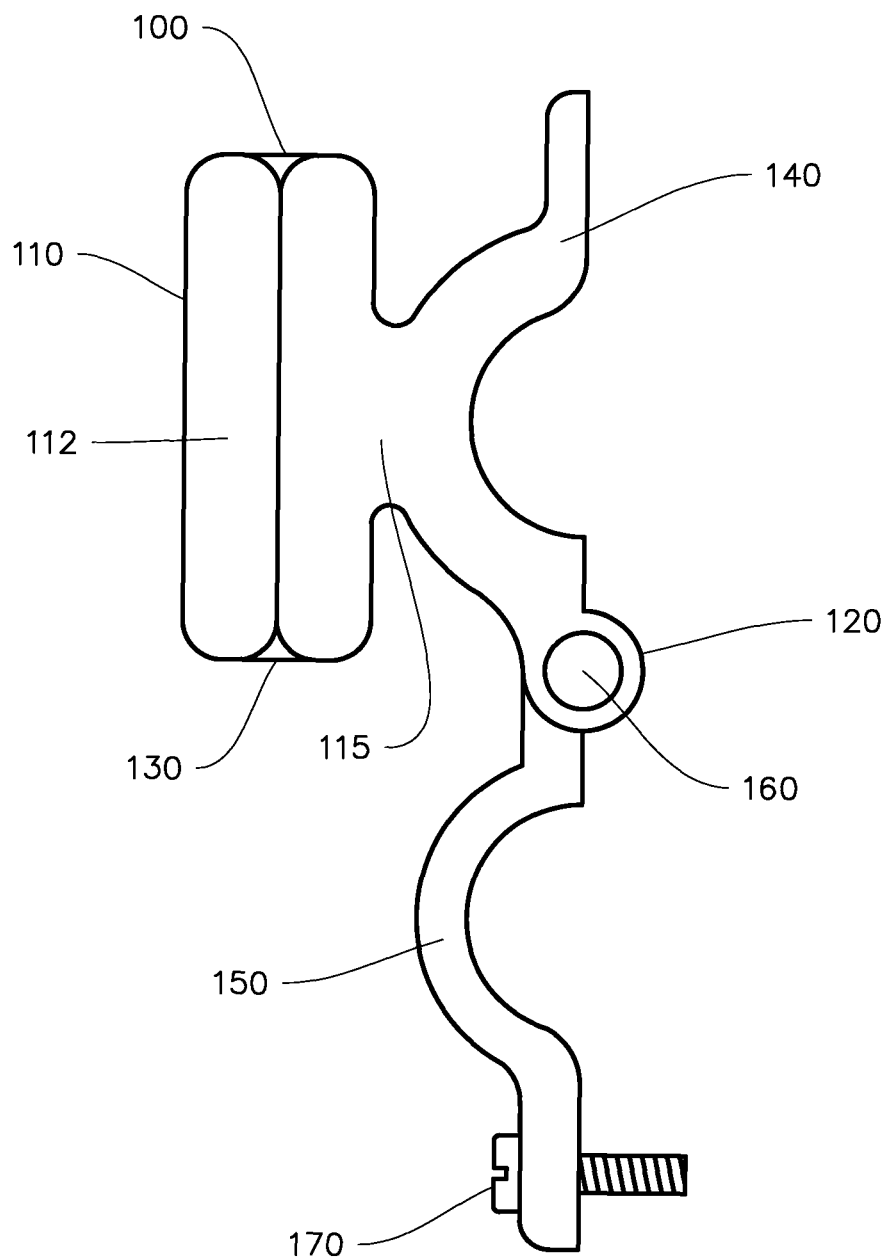
FIG. 4 is a front view of an apparatus of FIG. 1 an open configuration.
Figure 5:
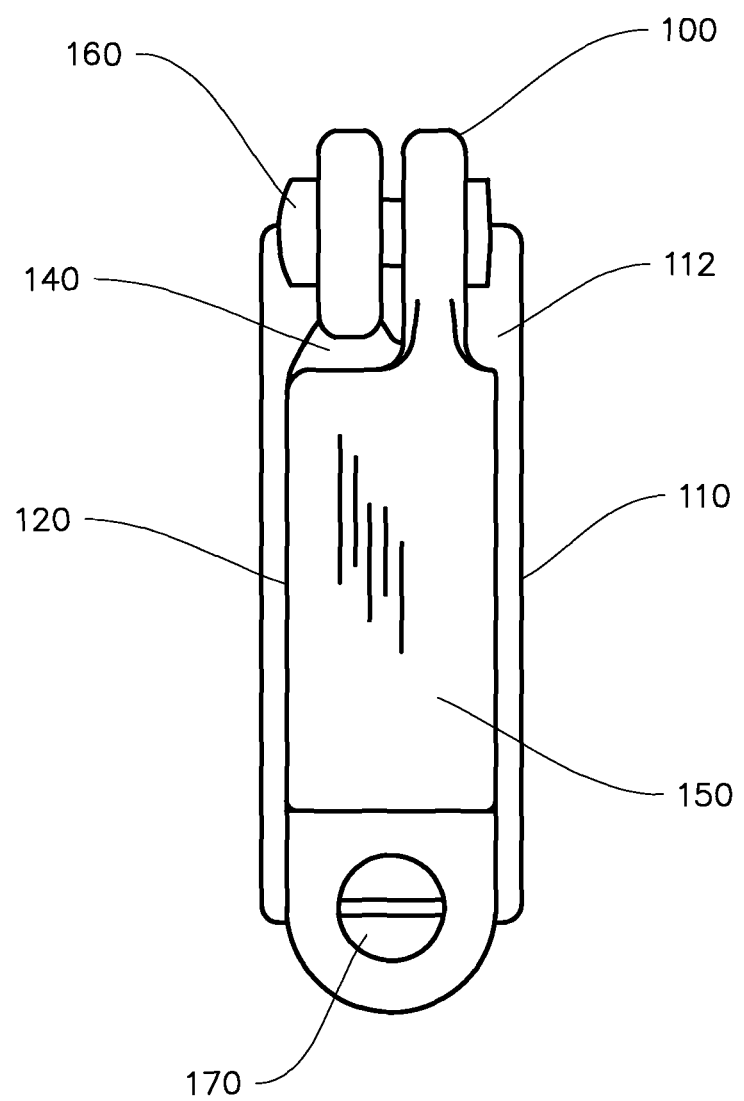
FIG. 5 is a side view of an apparatus of FIG. 1.
Figure 6:
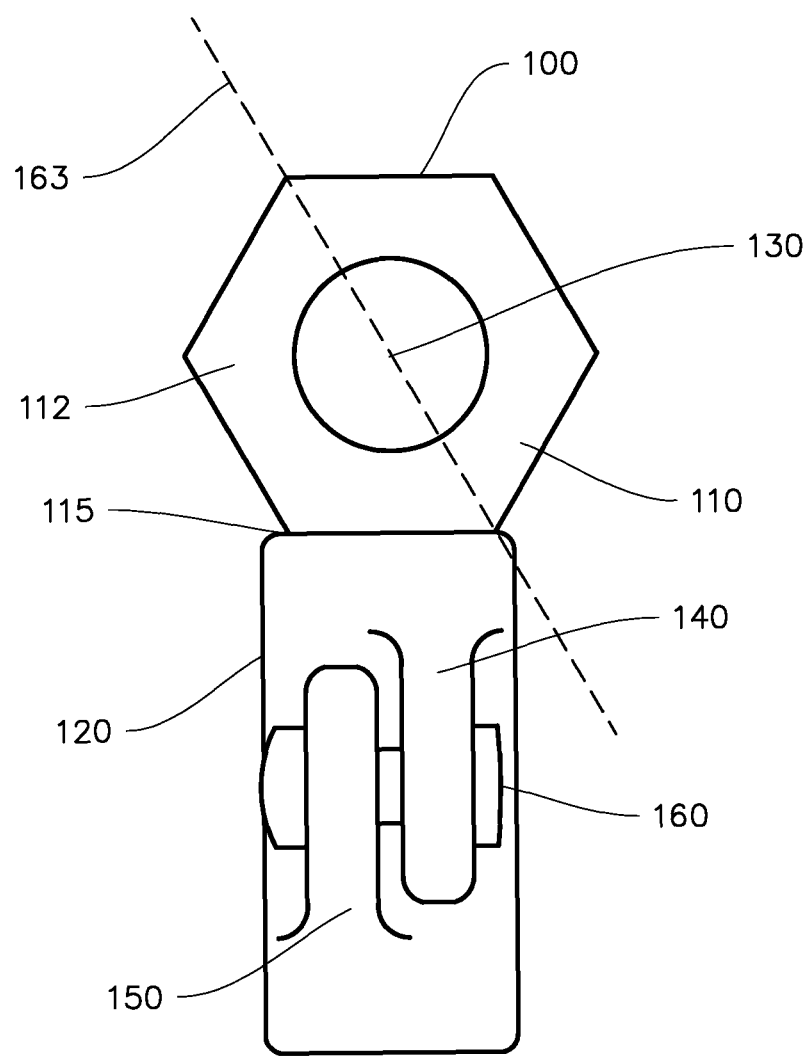
FIG. 6 is a top view of an apparatus of FIG. 1.
Figure 7:
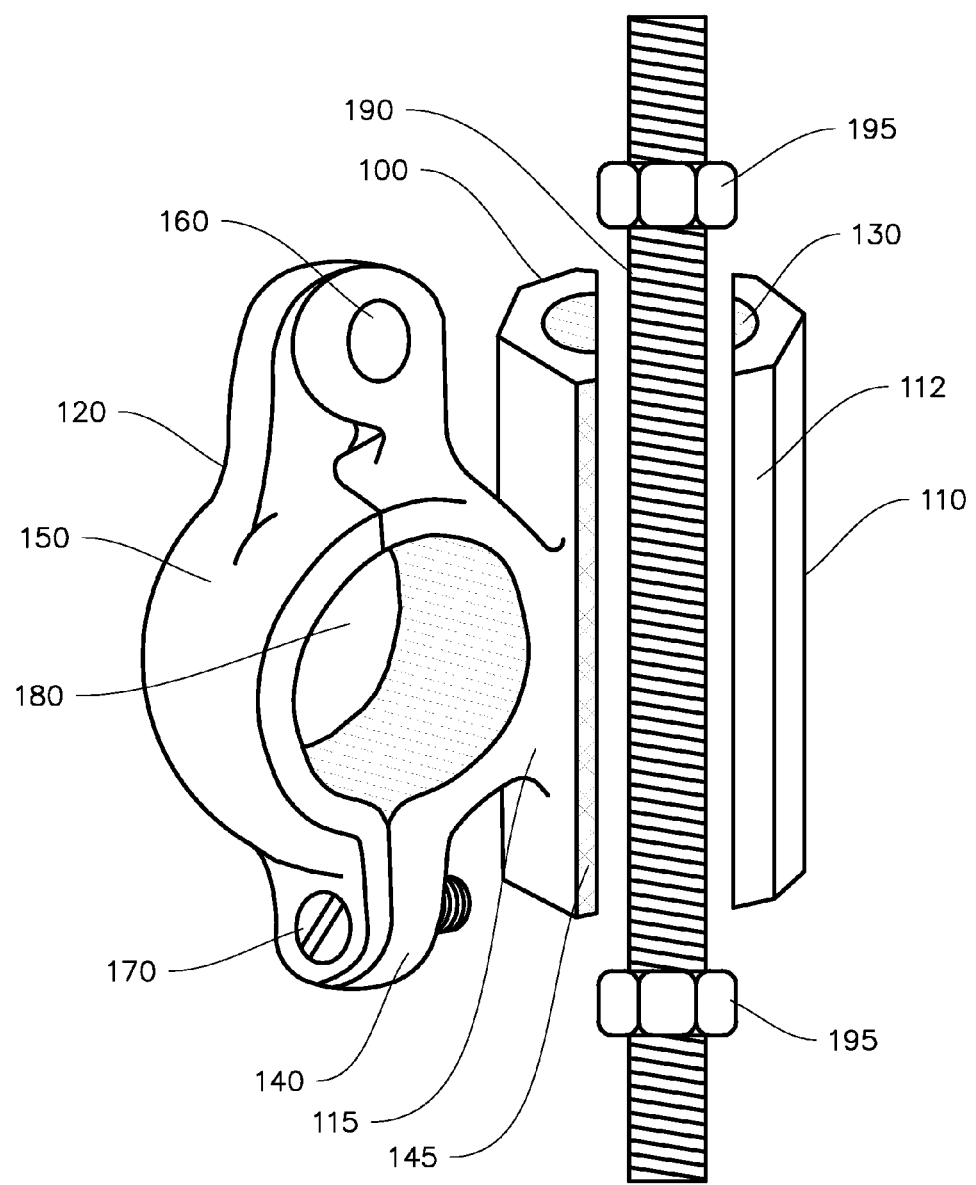
FIG. 7 is an exploded sectional perspective view of an apparatus of FIG. 1 shown with a threaded rod.
Figure 8:
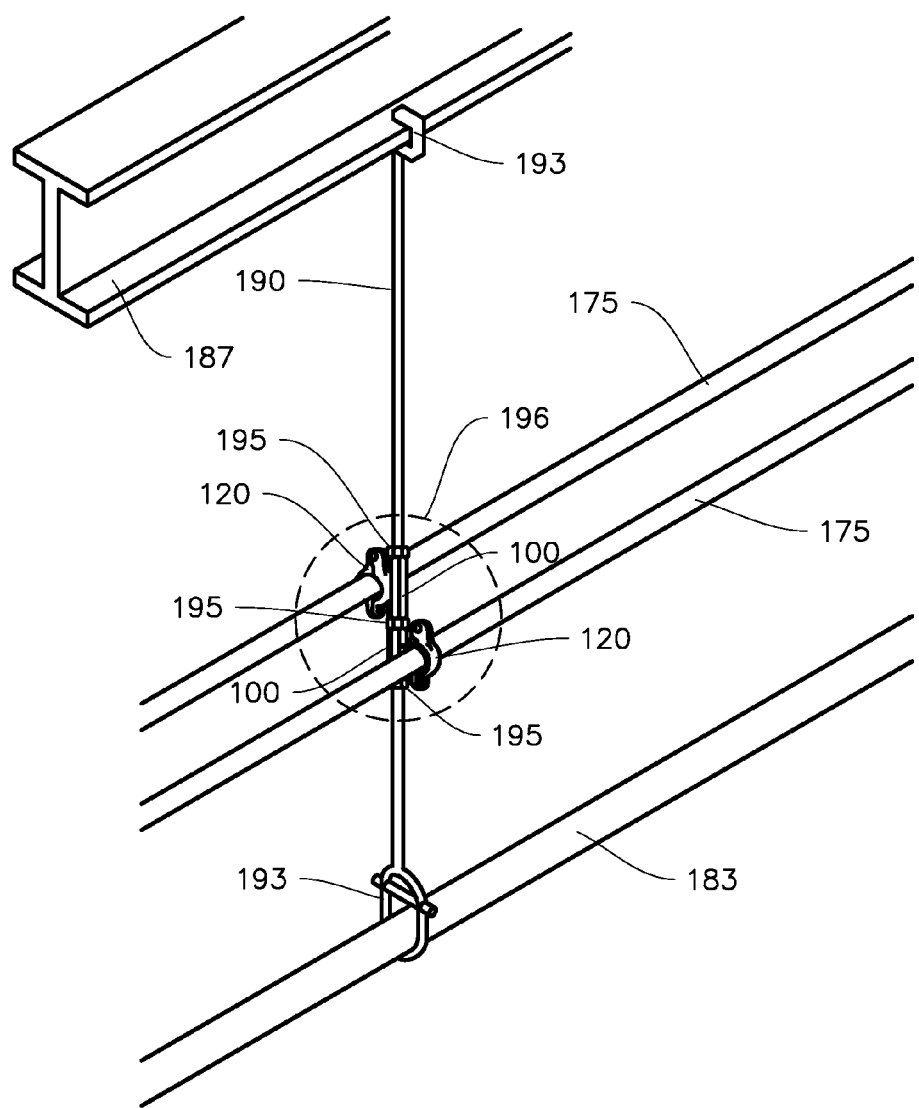
FIG. 8 is a perspective view of two apparatuses of FIG. 1 in an installed configuration.
Figure 9:
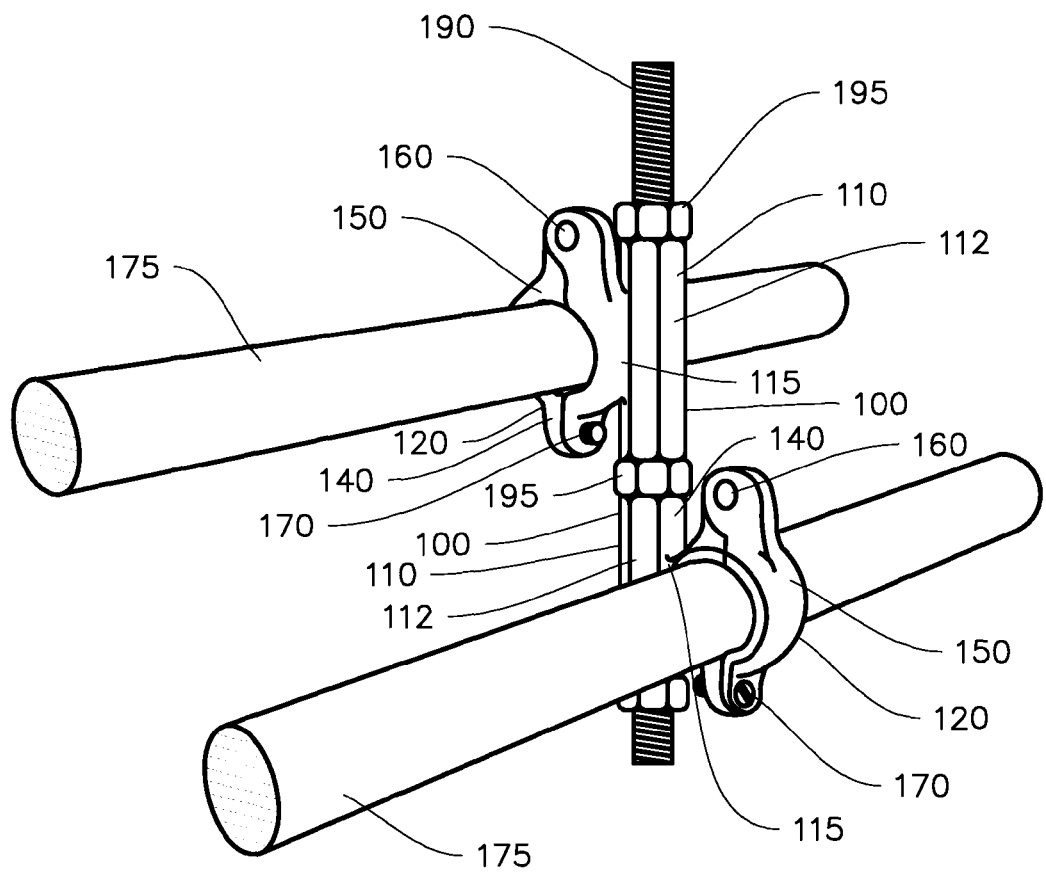
FIG. 9 is a close-up perspective view of two apparatuses of FIG. 8.
Figure 10:
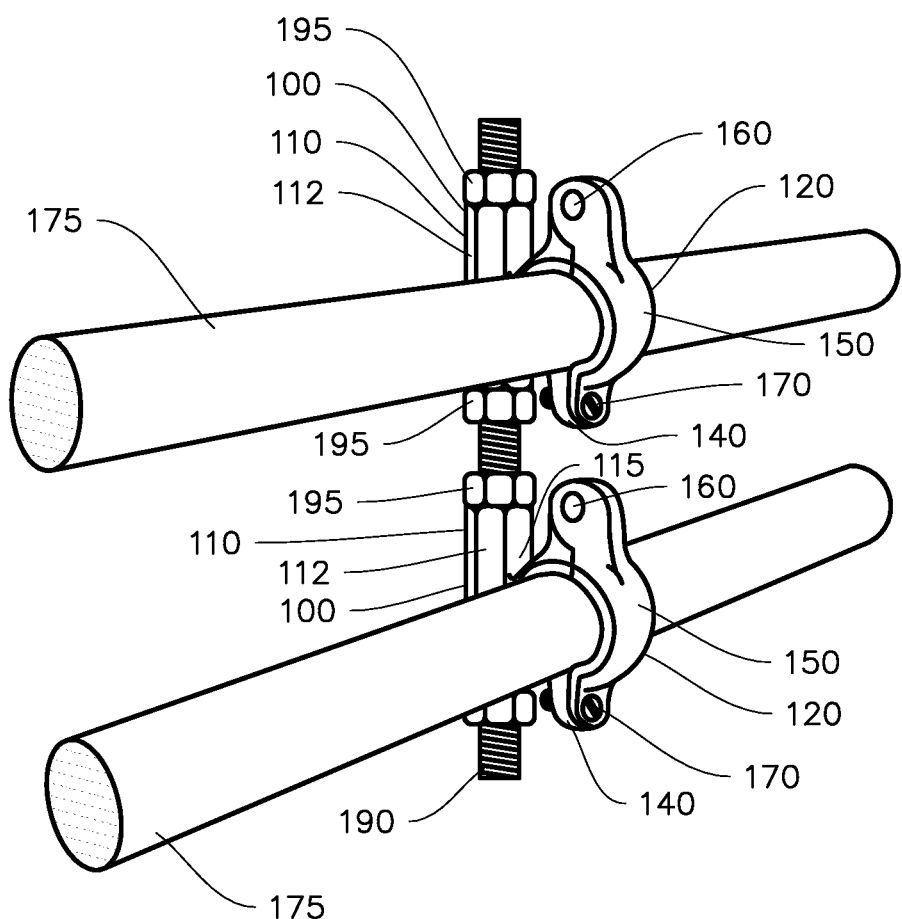
FIG. 10 is a perspective view of two apparatuses of FIG. 1 in an installed configuration.
Figure 11:
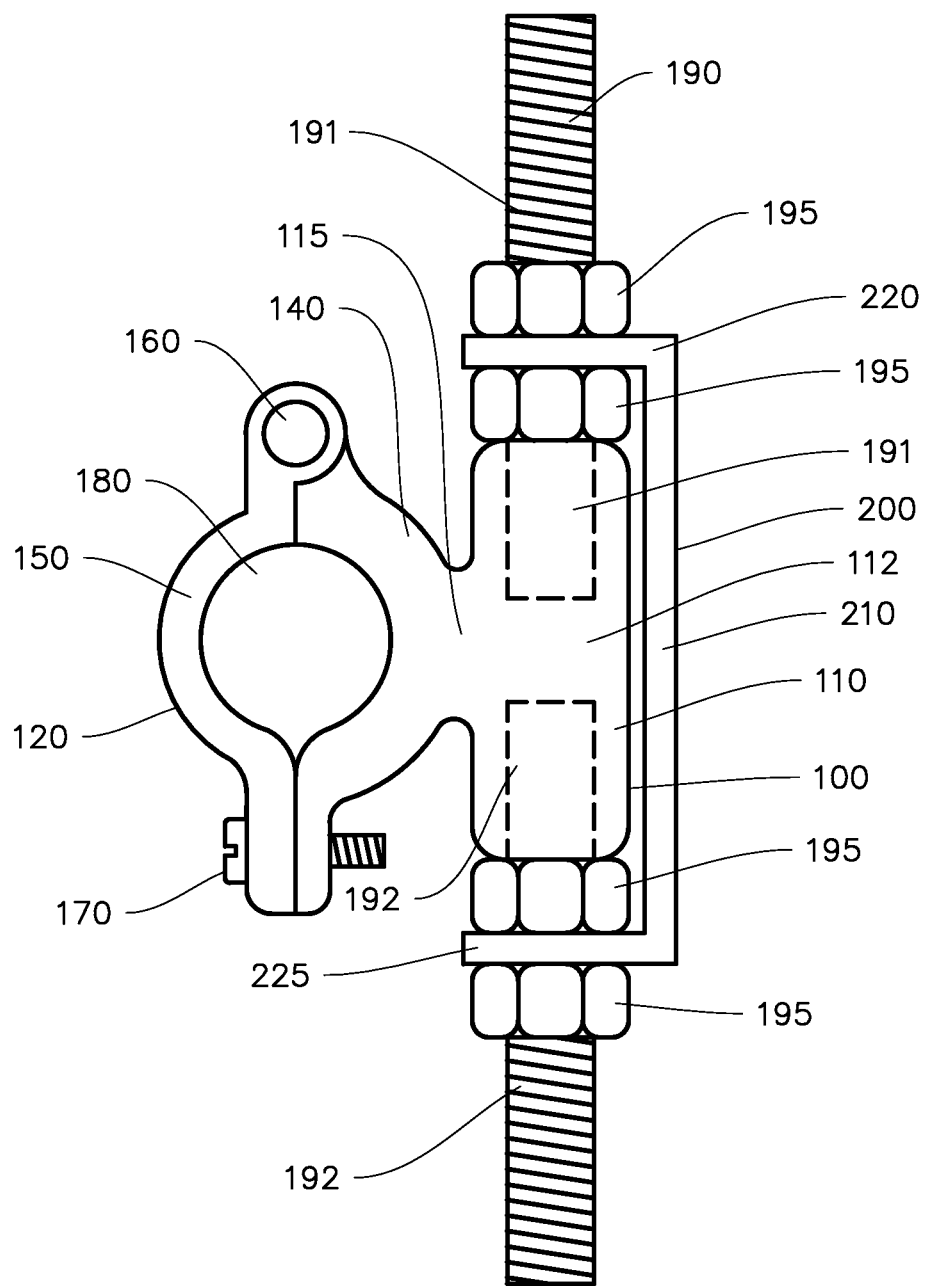
FIG. 11 is a rear view of an apparatus of FIG. 1 bridging two threaded rods using a "C" clamp.

Referring now to the most preferred embodiment of the invention, in FIG. 1, FIG. 2, FIG. 3, FIG. 4, FIG. 5, FIG. 6, FIG. 7, FIG. 8, FIG. 9, FIG. 10 and FIG. 11, a Pipe/Conduit Hanging Device 100 is shown. FIG. 1 demonstrates a perspective view of a Pipe/Conduit Hanging Device 100. FIG. 2 illustrates a front view of a Pipe/Conduit Hanging Device 100. FIG. 3 depicts a front view and a rear view of two Pipe/Conduit Hanging Devices 100 mounted on a threaded rod. FIG. 4 shows a front view of a Pipe/Conduit Hanging Device 100 in an open configuration. FIG. 5 displays a side view of a Pipe/Conduit Hanging Device 100. FIG. 6 demonstrates a top view of a Pipe/Conduit Hanging Device 100 with a section line 163 indicating the cutaway section of FIG. 7. FIG. 7 shows an exploded sectional perspective view of a Pipe/Conduit Hanging Device 100 and illustrates how the Pipe/Conduit Hanging Device 100 fits around a threaded rod 190 between two nuts 195. FIG. 8 displays a perspective view of two Pipe/Conduit Hanging Devices 100 in an installed configuration with two pipes 175 installed on different sides of the threaded rod 190. FIG. 9 illustrates a close-up perspective view of two Pipe/Conduit Hanging Devices 100 within the dotted line circle 196 of FIG. 8. FIG. 10 shows a perspective view of two Pipe/Conduit Hanging Devices 100 in an installed configuration with two pipes 175 installed on the same side of the threaded rod 190. FIG. 11 depicts a rear view of a Pipe/Conduit Hanging Device 100 bridging an upper threaded rod 191 and a lower threaded rod 192 using a "C" clamp 200.

In further detail, still referring to the invention of FIG. 1, FIG. 2, FIG. 3, FIG. 4, FIG. 5, FIG. 6, FIG. 7, FIG. 8, FIG. 9, FIG. 10 and FIG. 11, a Pipe/Conduit Hanging Device 100 comprises a split-ring clamp 120 distending from an unthreaded rod coupling 110. The split-ring clamp 120 comprises a clamp base 140 and a clamp arm 150, which are hinged together with a rivet 160 that allows the clamp arm 150 to swing away from the clamp base 140 to form the open configuration depicted in FIG. 4. A screw 170 allows the clamp arm 150 to be firmly secured to the clamp base 140 to form the closed configuration depicted in FIG. 1, FIG. 2, FIG. 3, FIG. 5, FIG. 6, FIG. 7, FIG. 8, FIG. 9, FIG. 10 and FIG. 11. The unthreaded rod coupling 110 comprises a body 112 with a sliding cavity 130, which is marginally larger in diameter than the diameter of a threaded rod 190 so that a threaded rod 190 may easily slide through the sliding cavity 130 while the Pipe/Conduit Hanging Device 100 is being installed. The clamp base 140 of the split-ring clamp 120 is permanently affixed to the body 112 of the unthreaded rod coupling 110 at the attachment point 115, thereby allowing the split-ring clamp 120 to distend from the unthreaded rod coupling 110. (Although the most preferred embodiment of the present invention is shown in the horizontal pipe hanging configuration, a split-ring clamp 120 can be mounted to the body 112 of the unthreaded rod coupling 110 at any desired angle or by using a pivoting attachment point 115 with a lock screw.) To use a Pipe/Conduit Hanging Device 100 to hang a pipe 175 or conduit, a threaded rod 190 is first suspended into the location where a pipe 175 will be hung. For the purposes of illustration, FIG. 8 shows a threaded rod 190 suspended from an I-beam 187 using a beam clamp 193. Next, a nut 195 is threaded onto the threaded rod and adjusted to the appropriate height just above the location where the Pipe/Conduit Hanging Device 100 will be mounted. Next, the unthreaded rod coupling 110 of the Pipe/Conduit Hanging Device 100 is slid onto the threaded rod 190 with the threaded rod 190 loosely, but securely, fitting through the sliding cavity 130. Next, a second nut 195 is threaded onto the threaded rod 190 and adjusted to firmly secure the Pipe/Conduit Hanging Device 100 between the two nuts 195 with the split-ring clamp 120 in the appropriate position to receive a pipe 175 for hanging. The precise location of the Pipe/Conduit Hanging device 100 may be adjusted by adjusting the nuts 195, between which the Pipe/Conduit Hanging Device 100 is sandwiched. Next, the screw 170 is removed from the clamp base 140 to allow the split-ring clamp 120 of the Pipe/Conduit Hanging Device 100 to be opened, as depicted in the open configuration of FIG. 4. Next, the pipe 175 to be hung is positioned in the pipe opening 180 between the clamp base 140 and the clamp arm 150, and the clamp arm 150 is closed and firmly secured to the clamp base 140 by reinserting the screw 170 into the clamp base 140 and tightening it; thereby suspending the pipe 175 with the Pipe/Conduit Hanging Device 100. Additional Pipe/Conduit Hanging Devices 100 may then be added to the threaded rod 190 and secured in place with additional nuts 195 in order to hang multiple pipes 175 or conduits from the threaded rod 190. The Pipe/Conduit Hanging Devices 100 may be installed in a configuration in which the pipes 175 are on different sides of the threaded rod 190, as shown in FIG. 3, FIG. 8 and FIG. 9, or the Pipe/Conduit Hanging Devices 100 may be installed in a configuration in which the pipes 175 are on the same side of the threaded rod 190, as shown in FIG. 10. The Pipe/Conduit Hanging Devices 100 may also be installed in order to facilitate hanging a pipe at any angle around the threaded rod 190.

Figure 12:
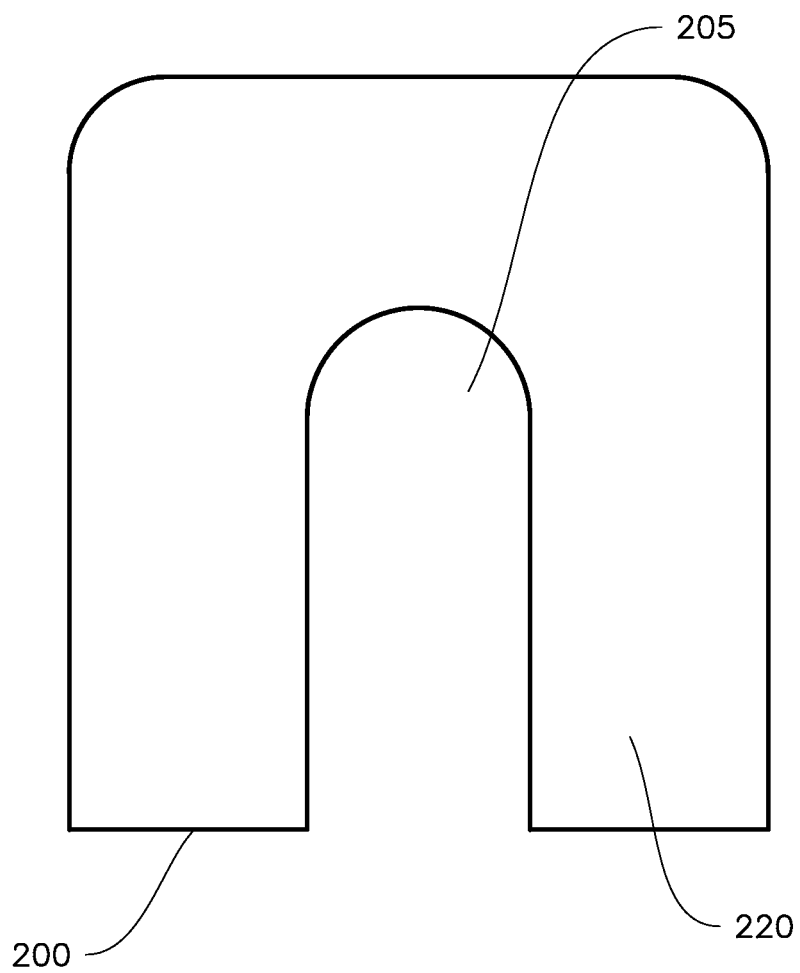
FIG. 12 is a top view of a "C" clamp of FIG. 11.

In further detail, referring now to FIG. 11 and FIG. 12, a Pipe/Conduit Hanging Device 100 is shown bridging the span between an upper threaded rod 191 and a lower threaded rod 192 using a "C" clamp 200. FIG. 11 demonstrates how a "C" clamp 200 is assembled in conjunction with a Pipe/Conduit Hanging Device 100 in order to span the gap between an upper threaded rod 191 and a lower threaded rod 192. FIG. 12 shows a top view of the "C" clamp 200. The "C" clamp comprises an upper "C" clamp head 220 and a lower "C" clamp head 225, which both distend perpendicularly in the same direction from a "C" clamp body 210. The upper "C" clamp head 220 and lower "C" clamp head 225 further comprise a mounting gap 205, which securely fits around a threaded rod 190. In order to insert a Pipe/Conduit Hanging Device 100 onto an existing threaded rod 190, the existing threaded rod 190, or a section of the existing threaded rod 190, is cut at the location where the Pipe/Conduit Hanging Device 100 will be inserted, creating an upper threaded rod 191 and a lower threaded rod 192. Next, a first nut 195 is threaded onto the bottom of the upper threaded rod 191, and the mounting gap 205 of the upper "C" clamp head 220 is fitted over upper threaded rod 191 under the first nut 195. Next, a second nut 195 is threaded onto the bottom of the upper threaded rod 191 and adjusted so that it firmly abuts the bottom of the upper "C" clamp head 220, thereby securing the "C" clamp 200 firmly to the upper threaded rod 191 by sandwiching the upper "C" clamp head 220 between the first and second nuts 195. Next, a Pipe/Conduit Hanging Device 100 is fitted onto the upper threaded rod 191. Next, a third nut 195 and a fourth nut 195 are threaded onto the top of the lower threaded rod 192, and the top of the lower threaded rod 192 is fitted into the bottom of the Pipe/Conduit Hanging Device 100. Next, the mounting gap 205 of the lower "C" clamp head 225 of the "C" clamp 200 is fitted over the lower threaded rod 192 so that the lower "C" clamp head 225 is sandwiched between the third and fourth nuts 195. Next, the nuts 195 are adjusted and tightened so that the Pipe/Conduit Hanging Device 100 and "C" clamp 200 assembly is firmly secured between the upper threaded rod 191 and the lower threaded rod 192. Once the Pipe/Conduit Hanging Device 100 and "C" clamp 200 assembly is secured, a pipe 175 or conduit may be hung through the pipe opening 180 in the split-ring clamp 120 of the Pipe/Conduit Hanging Device 100, as described above. Similarly, in order to add an additional lower threaded rod 192 below an upper threaded rod 191, a first nut 195 is threaded onto the bottom of the upper threaded rod 191, and the mounting gap 205 of the upper "C" clamp head 220 is fitted over upper threaded rod 191 under the first nut 195. Next, a second nut 195 is threaded onto the bottom of the upper threaded rod 191 and adjusted so that it firmly abuts the bottom of the upper "C" clamp head 220, thereby securing the "C" clamp 200 firmly to the upper threaded rod 191 by sandwiching the upper "C" clamp head 220 between the first and second nuts 195. Next, a Pipe/Conduit Hanging Device 100 is fitted onto the upper threaded rod 191. Next, a third nut 195 and a fourth nut 195 are threaded onto the top of the lower threaded rod 192, which is to be added under the upper threaded rod 191, and the top of the lower threaded rod 192 is fit into the bottom of the Pipe/Conduit Hanging Device 100. Next, the mounting gap 205 of the lower "C" clamp head 225 of the "C" clamp 200 is fitted over the lower threaded rod 192 so that the lower "C" clamp head 225 is sandwiched between the third and fourth nuts 195. Next, the nuts 195 are adjusted and tightened so that the Pipe/Conduit Hanging Device 100 and "C" clamp 200 assembly is firmly secured between the upper threaded rod 191 and the lower threaded rod 192. Once the Pipe/Conduit Hanging Device 100 and "C" clamp 200 assembly is secured, a pipe 175 or conduit may be hung through the pipe opening 180 in the split-ring clamp 120 of the Pipe/Conduit Hanging Device 100, as described above. Additional lower threaded rods 192 may be added in series below the upper threaded rod 191 as desired.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11 and FIG. 12, are that a Pipe/Conduit Hanging Device 100 comprises a split-ring clamp 120 distending from an unthreaded rod coupling 110. The split-ring clamp 120 comprises a clamp base 140 and a clamp arm 150, which are hinged together with a rivet 160 that allows the clamp arm 150 to swing away from the clamp base 140, and which may be firmly secured together with a screw 170 in order to hang a pipe 175 in the pipe opening 180. The unthreaded rod coupling 110 comprises a body 112 with a sliding cavity 130, which is marginally larger in diameter than the diameter of a threaded rod 190 so that a threaded rod 190 may easily slide through the sliding cavity 130 while the Pipe/Conduit Hanging Device 100 is being installed. The clamp base 140 of the split-ring clamp 120 is permanently affixed to the body 112 of the unthreaded rod coupling 110 at the attachment point 115, thereby allowing the split-ring clamp 120 to distend from the unthreaded rod coupling 110 with the clamp base 140 of the split-ring clamp 120 and the unthreaded rod coupling 110 formed as a singular construction. (Although the most preferred embodiment of the present invention is shown in the horizontal pipe hanging configuration, a split-ring clamp 120 can be mounted to the body 112 of the unthreaded rod coupling 110 at any desired angle or by using a pivoting attachment point 115 with a lock screw.) A Pipe/Conduit Hanging Device 100 is firmly held in place on a threaded rod 190 by being sandwiched between a pair of nuts 195. A "C" clamp 200 may be used to allow a Pipe/Conduit Hanging Device 100 to bridge a gap between two threaded rods 190, when appropriate. The construction of a Pipe/Conduit Hanging Device 100, nuts 195 and a "C" clamp 200, comprises steel, copper cladding, plastic, high density plastic, silicone, PVC, composite material, metal, galvanized steel, stainless steel, aluminum, brass, copper, or other like material, which has sufficient strength to support a pipe or conduit, along with its contents, from a threaded rod 190. For use with copper pipes, the Pipe/Conduit Hanging Device 100 may be copper clad or used with a plastic isolator.

Figure 13:
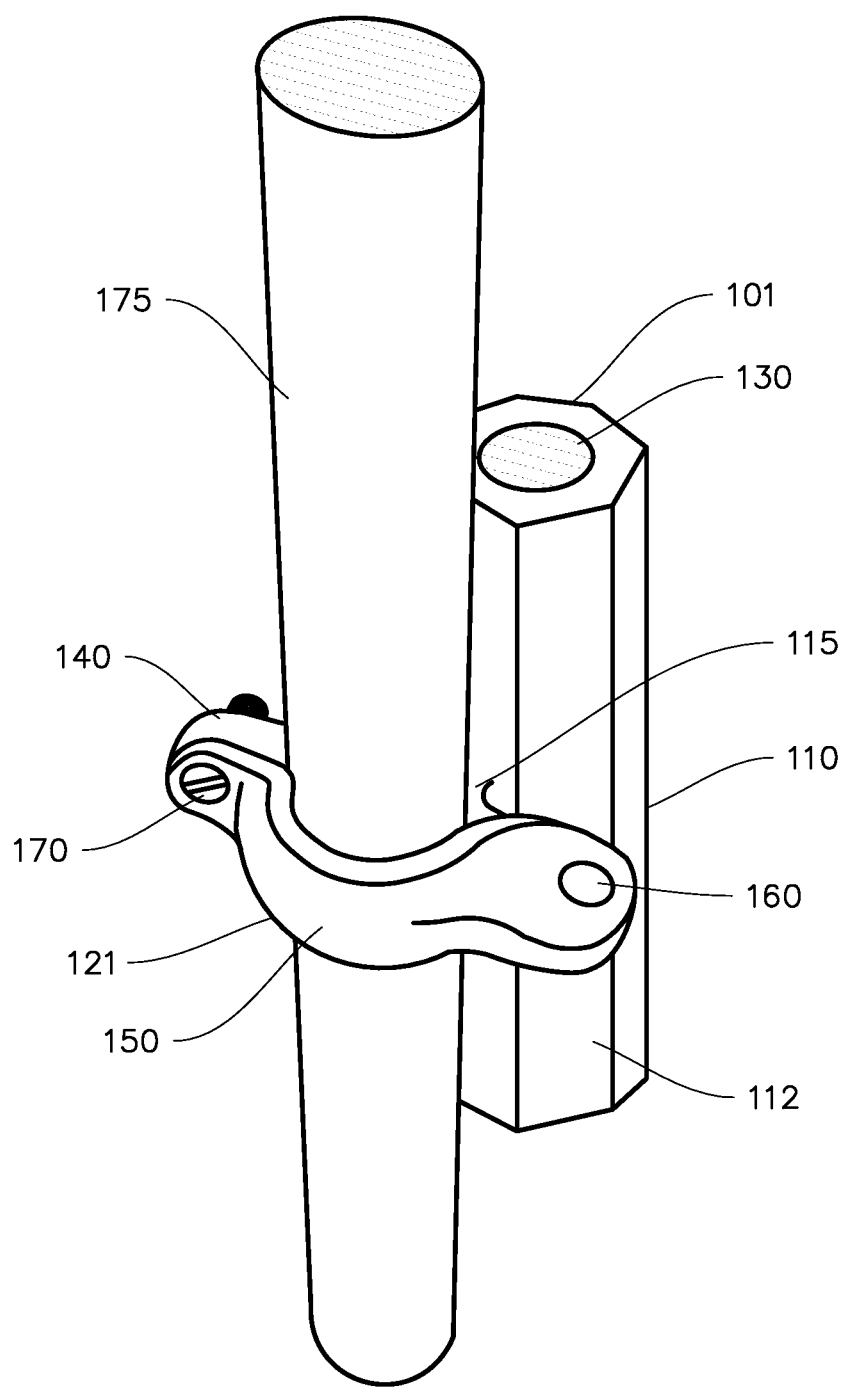
FIG. 13 is a perspective view of another embodiment of the present invention hanging a pipe in a parallel configuration.
Figure 14:
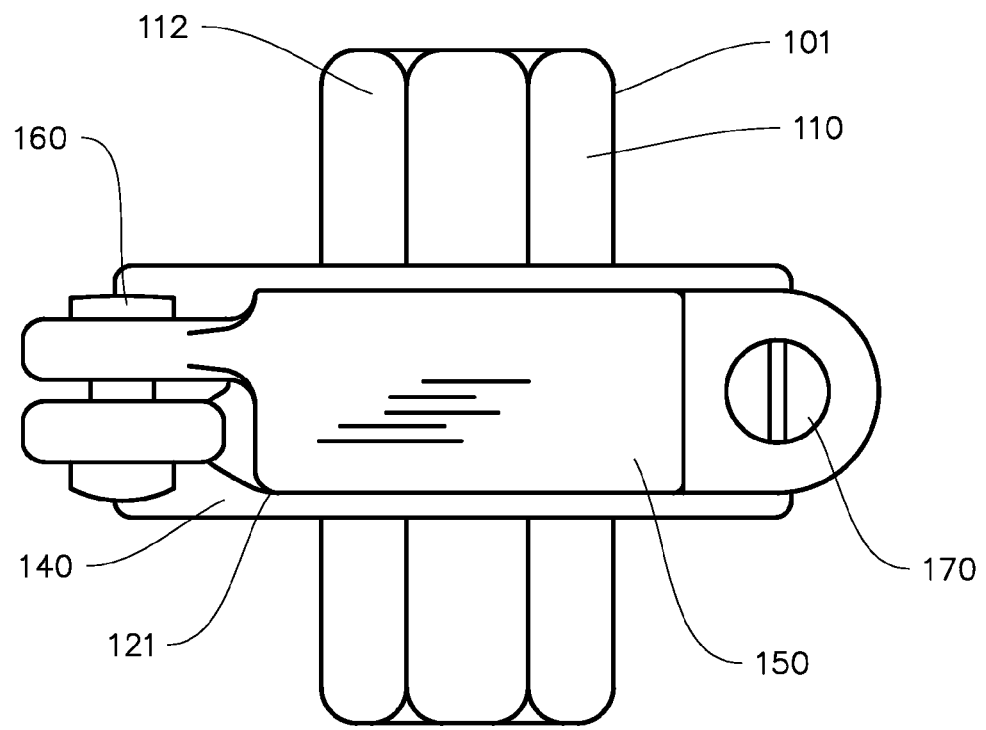
FIG. 14 is a side view of the apparatus of FIG. 13.

Referring now to another embodiment of the invention, in FIG. 13 and FIG. 14 a Vertical Pipe/Conduit Hanging Device 101 is shown. FIG. 13 shows a perspective view of a Vertical Pipe/Conduit Hanging Device 101 hanging a pipe 175 vertically. FIG. 14 is a side view of a Vertical Pipe/Conduit Hanging Device 101. A Vertical Pipe/Conduit Hanging Device 101 comprises a perpendicular split-ring clamp 121 distending from an unthreaded rod coupling 110. The perpendicular split-ring clamp 121 comprises a clamp base 140 and a clamp arm 150, which are hinged together with a rivet 160 that allows the clamp arm 150 to swing away from the clamp base 140, enabling a pipe 175 to be inserted into the pipe opening 180 between the clamp arm 150 and the clamp base 140. A screw 170 allows the clamp arm 150 to be firmly secured to the clamp base 140. The unthreaded rod coupling 110 comprises a body 112 with a sliding cavity 130, which is marginally larger in diameter than the diameter of a threaded rod 190 so that a threaded rod 190 may easily slide through the sliding cavity 130 while the Vertical Pipe/Conduit Hanging Device 101 is being installed. The clamp base 140 of the perpendicular split-ring clamp 121 is permanently affixed to the body 112 of the unthreaded rod coupling 110 at the attachment point 115, thereby allowing the perpendicular split-ring clamp 121 to distend from the unthreaded rod coupling 110. (Although this embodiment of the present invention is shown in the vertical pipe hanging configuration, a perpendicular split-ring clamp 121 can be mounted to the body 112 of the unthreaded rod coupling 110 at any desired angle or by using a pivoting attachment point 115 with a lock screw.) Mounting the perpendicular split-ring clamp 121 perpendicular to the unthreaded rod coupling 110 allows a pipe 175 to be hung vertically and parallel to the threaded rod 190, which fits through the sliding cavity 130 of the unthreaded rod coupling 110. The Vertical Pipe/Conduit Hanging Device 101 is attached to a threaded rod 190 using nuts 195 in the same manner as the Pipe/Conduit Hanging Device 100, as described above. The Vertical Pipe/Conduit Hanging Device 101 may also be used in conjunction with the "C" clamp assembly of FIG. 11 and FIG. 12.

The construction details of the invention as shown in FIG. 13 and FIG. 14 are that a Vertical Pipe/Conduit Hanging Device 101 comprises a perpendicular split-ring clamp 121 distending from an unthreaded rod coupling 110. The perpendicular split-ring clamp 121 comprises a clamp base 140 and a clamp arm 150, which are hinged together with a rivet 160 that allows the clamp arm 150 to swing away from the clamp base 140, and which may be firmly secured together with a screw 170 in order to hang a pipe 175 in the pipe opening 180 parallel to the threaded rod 190. The unthreaded rod coupling 110 comprises a body 112 with a sliding cavity 130, which is marginally larger in diameter than the diameter of a threaded rod 190 so that a threaded rod 190 may easily slide through the sliding cavity 130 while the Vertical Pipe/Conduit Hanging Device 101 is being installed. The clamp base 140 of the perpendicular split-ring clamp 121 is permanently affixed to the body 112 of the unthreaded rod coupling 110 at the attachment point 115, thereby allowing the perpendicular split-ring clamp 121 to distend from the unthreaded rod coupling 110 with the clamp base 140 of the perpendicular split-ring clamp 121 and the unthreaded rod coupling 110 formed as a singular construction. (Although the preferred embodiments of the present invention are shown in the vertical pipe hanging configuration, a perpendicular split-ring clamp 121 can be mounted to the body 112 of the unthreaded rod coupling 110 at any desired angle or by using a pivoting attachment point 115 with a lock screw.) A Vertical Pipe/Conduit Hanging Device 101 is firmly held in place on a threaded rod 190 by being sandwiched between a pair of nuts 195. A "C" clamp 200 may be used to allow a Vertical Pipe/Conduit Hanging Device 101 to bridge a gap between two threaded rods 190, when appropriate. The construction of a Vertical Pipe/Conduit Hanging Device 101, nuts 195 and a "C" clamp 200, comprises steel, copper cladding, plastic, high density plastic, silicone, PVC, composite material, metal, galvanized steel, stainless steel, aluminum, brass, copper, or other like material, which has sufficient strength to support a pipe or conduit, along with its contents, from a threaded rod 190. For use with copper pipes, the Vertical Pipe/Conduit Hanging Device 101 may be copper clad or used with a plastic isolator.

Figure 15:
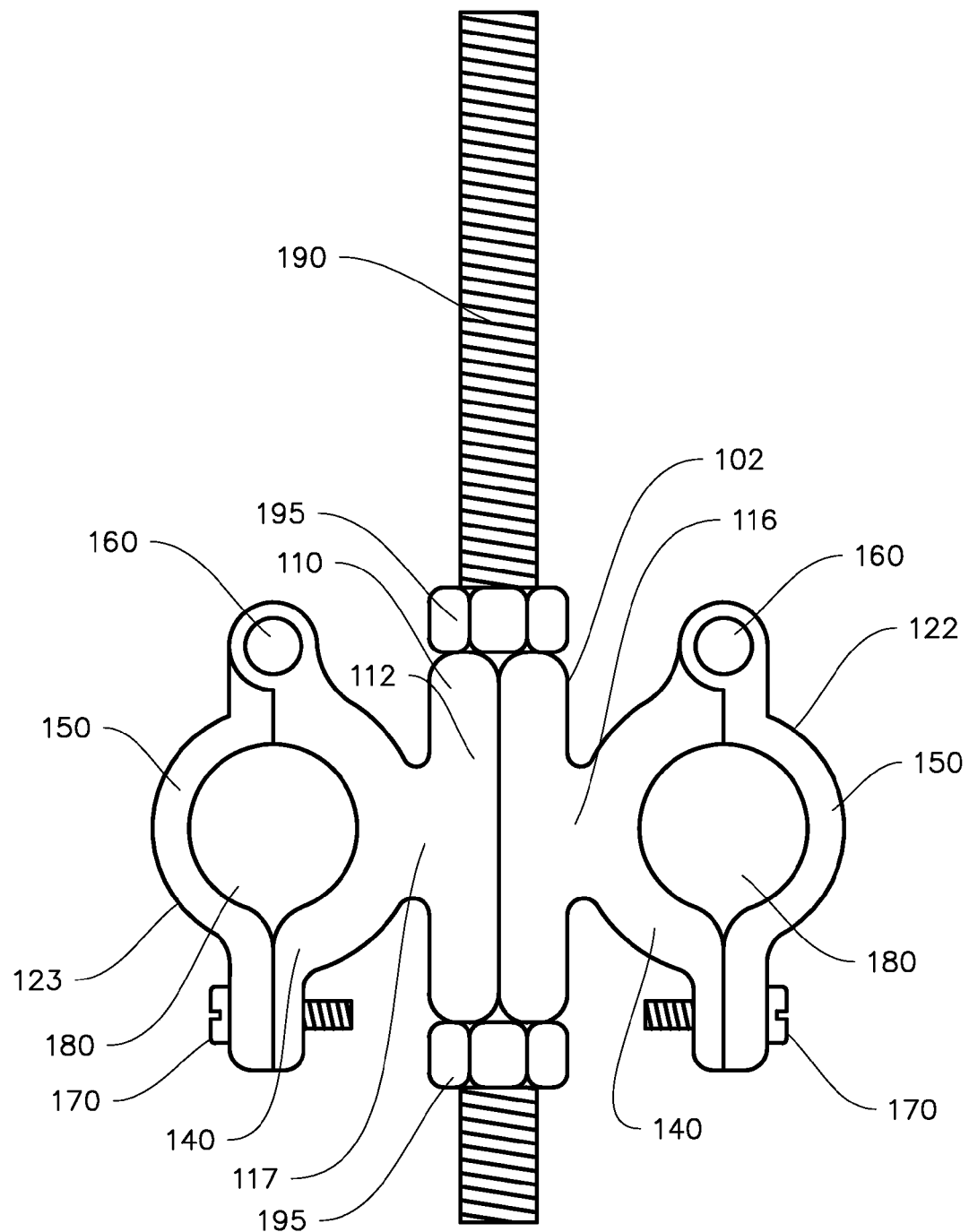
FIG. 15 is a front view of another embodiment of the present invention mounted on a threaded rod.

Referring now to another embodiment of the invention, in FIG. 15 a Double Pipe/Conduit Hanging Device 102 is shown. FIG. 15 shows a front view of a Double Pipe/Conduit Hanging Device 102 mounted on a threaded rod 190. Two pipes 175 may be simultaneously suspended from the Double Pipe/Conduit Hanging Device 102. A Double Pipe/Conduit Hanging Device 102 comprises a right split-ring clamp 122 and a left split-ring clamp 123 distending from opposite sides an unthreaded rod coupling 110. The right split-ring clamp 122 and left split-ring clamp 123 comprise a clamp base 140 and a clamp arm 150, which are hinged together with a rivet 160 that allows the clamp arm 150 to swing away from the clamp base 140, permitting a pipe 175 to be inserted into the pipe opening 180 between the clamp arm 150 and the clamp base 140. On the right split-ring clamp 122 and the left split-ring clamp 123, a screw 170 allows the clamp arm 150 to be firmly secured to the clamp base 140 in order to hold a pipe 175 firmly in pipe opening 180. The unthreaded rod coupling 110 comprises a body 112 with a sliding cavity 130, which is marginally larger in diameter than the diameter of a threaded rod 190 so that a threaded rod 190 may easily slide through the sliding cavity 130 while the Double Pipe/Conduit Hanging Device 102 is being installed. The clamp base 140 of the right split-ring clamp 122 is permanently affixed to the body 112 of the unthreaded rod coupling 110 at the right attachment point 116, and the clamp base 140 of the left split-ring clamp 123 is permanently affixed to the body 112 of the unthreaded rod coupling 110 at the left attachment point 117 on the opposite side of the unthreaded rod coupling 110 from the right attachment point 116, thereby allowing the right split-ring clamp 122 and the left split-ring clamp 123 to distend from opposite sides of the unthreaded rod coupling 110. (Although this embodiment of the present invention is shown with a parallel double pipe hanging configuration, a right split-ring clamp 122 and a left split-ring clamp 123 can be mounted to the body 112 of the unthreaded rod coupling 110 at any desired angle or by using a pivoting attachment points 116, 117 with a lock screw.) Mounting a right split-ring clamp 122 and a left split-ring clamp 123 on opposite sides of the unthreaded rod coupling 110 allows two pipes 175 to be simultaneously hung from the threaded rod 190, which fits through the sliding cavity 130 of the unthreaded rod coupling 110. The Double Pipe/Conduit Hanging Device 102 is attached to a threaded rod 190 using nuts 195 in the same manner as the Pipe/Conduit Hanging Device 100, as described above. The Double Pipe/Conduit Hanging Device 101 may also be used in conjunction with the "C" clamp assembly of FIG. 11 and FIG. 12. Additionally, a plurality of split-ring clamps 122,123 could be used with the unthreaded rod coupling 110, as practicable.

The construction details of the invention as shown in FIG. 15 are that a Double Pipe/Conduit Hanging Device 102 comprises a right split-ring clamp 122 and a left split-ring clamp 123 distending from opposite sides of an unthreaded rod coupling 110. The right split-ring clamp 122 and left split-ring clamp comprise a clamp base 140 and a clamp arm 150, which are hinged together with a rivet 160 that allows the clamp arm 150 to swing away from the clamp base 140, and which may be firmly secured together with a screw 170 in order to hang a pipe 175 in the pipe opening 180. The unthreaded rod coupling 110 comprises a body 112 with a sliding cavity 130, which is marginally larger in diameter than the diameter of a threaded rod 190 so that a threaded rod 190 may easily slide through the sliding cavity 130 while the Double Pipe/Conduit Hanging Device 102 is being installed. The clamp base 140 of the right split-ring clamp 122 is permanently affixed to the body 112 of the unthreaded rod coupling 110 at the right attachment point 116, and the clamp base 140 of the left split-ring clamp 123 is permanently affixed to the body 112 of the unthreaded rod coupling 110 at the left attachment point 117 on the opposite side of the unthreaded rod coupling 110 from the right attachment point 116, thereby allowing the right split-ring clamp 122 and the left split-ring clamp 123 to distend from opposite sides of the unthreaded rod coupling 110 with the clamp base 140 of the right split-ring clamp 122, the clamp base 140 of the left split-ring clamp 123 and the unthreaded rod coupling 110 formed as a singular construction. (Although this embodiment of the present invention is shown in a double pipe hanging configuration, a plurality of right split-ring clamps 122 and left split-ring clamps 123 can be mounted to the body 112 of the unthreaded rod coupling 110 in order to accommodate a larger number of pipes 175 or conduits, and the right split-ring clamps 122 and left split-ring clamps 123 can be mounted to the body 112 of the unthreaded rod coupling 110 at any desired angle or by using a pivoting attachment point 115 with a lock screw in order to facilitate multiple pipe 175 or conduit orientations.) A Double Pipe/Conduit Hanging Device 102 is firmly held in place on a threaded rod 190 by being sandwiched between a pair of nuts 195. A "C" clamp 200 may be used to allow a Double Pipe/Conduit Hanging Device 102 to bridge a gap between two threaded rods 190, when appropriate. The construction of a Double Pipe/Conduit Hanging Device 102, nuts 195 and a "C" clamp 200, comprises steel, copper cladding, plastic, high density plastic, silicone, PVC, composite material, metal, galvanized steel, stainless steel, aluminum, brass, copper, or other like material, which has sufficient strength to support one or more pipes or conduits, along with their contents, from a threaded rod 190. For use with copper pipes, the Double Pipe/Conduit Hanging Device 102 may be copper clad or used with a plastic isolator.

The advantages of the present invention include, without limitation, that it can greatly reduce the time, materials and labor required during a construction that requires the hanging of one or more pipes or conduits horizontally or vertically, or at any desired angle. Instead of welding pipes to threaded rods on a construction site, the singular construction and standard-shaped components of the present invention allow for the device to be mass produced, allowing a complete piping system's hangers to be installed in substantially less time and with substantially less materials and cost. Additionally, the present invention allows an installer to ride a single beam, using a beam clamp to run the required distance, or to run pipe or conduit on opposite sides or the same side of a single threaded rod, permitting greater versatility when hanging pipe or conduit around preexisting obstacles. The present invention also allows an installer to run each pipe at different elevations to clear other mechanical systems and obstructions. Moreover, an installer can use a system of devices to support a vertical line of pipes or conduits. Further, a non-plastic, all metal construction version of the present invention allows use in places where building codes require all materials to consist of non-toxic or non-flammable materials, such as a return air plenum. The present invention may also be used in wood frame construction environments.

In broad embodiment, the present invention relates generally to an apparatus, system and method for hanging one or more pipes or conduits from a single threaded rod. In broad embodiment, the Pipe/Conduit Hanging Device comprises an unthreaded rod coupling with one or more pipe clamps distending from the unthreaded rod coupling, which may be slidably adjusted along a threaded rod and held in place by a pair of nuts. The Pipe/Conduit Hanging Device may be used individually or in a system comprising multiple Pipe/Conduit Hanging Devices working in conjunction. Although a split-ring type is described in the preferred embodiments, any type of clamp or pipe clamp can be distended from the unthreaded rod coupling.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus for hanging one or more pipes or conduits, said apparatus comprising:

an unthreaded rod coupling, said unthreaded rod coupling comprising
    a body, said body comprising an elongated collar and
    a sliding cavity, which is marginally larger in diameter than the diameter of a threaded rod and which runs the length of said elongated collar; and
one or more split-ring clamps, said split-ring clamps comprising
    a base, said base comprising a first half circle that conforms to the outer circumference of said pipes or conduits,
    a pivoting clamp arm, said pivoting clamp arm comprising a second half circle that conforms to said outer circumference of said pipes of conduits,
    a hinge, and
    a locking mechanism,
    said pivoting clamp arm being swingably connected to said base using said hinge,
    said base of said split-ring clamps distending from said body of said unthreaded rod coupling,
    said split-ring clamps being capable of supporting said pipes or conduits securely by substantially contacting said outer circumference of said pipes or conduits;
wherein said sliding cavity of said unthreaded rod coupling slidably fits over said threaded rod and is secured in place between a first nut and a second nut threaded onto said threaded rod, allowing said apparatus to hang said pipes or conduits secured in said split-ring clamps from said threaded rod.

2. The apparatus of claim 1, wherein said split ring clamps are mounted parallel to said body in order to suspend said pipes or conduits horizontally.

3. The apparatus of claim 1, wherein said split ring clamps are mounted perpendicular to said body in order to suspend said pipes or conduits vertically.

4. The apparatus of claim 1, further comprising a "C" clamp to span a gap between two said threaded rods, said "C" clamp comprising
    a "C' clamp body;
    an upper "C" clamp head with an upper mounting gap; and
    a lower "C" clamp head with a lower mounting gap;
    wherein said upper "C" clamp head and lower "C" clamp head distend perpendicularly in the same direction from a "C" clamp body.

5. A method and system that facilitates said apparatus of claim 1, said method comprising:
    suspending said threaded rod into the location where said pipe or conduit will be hung;
    threading said first nut onto said threaded rod;
    adjusting said first nut to the appropriate height just above the location where said apparatus will be installed;
    sliding said unthreaded rod coupling of said apparatus onto said threaded rod by inserting said threaded rod through said sliding cavity and said elongated collar;
    threading said second nut onto said threaded rod;
    adjusting said second nut to firmly secure said apparatus between said first nut and said second nut with said split-ring clamps in the appropriate positions to receive said pipes or conduits for hanging;
    positioning said pipes or conduits to be hung in said first half circle of said base of said split-ring clamps; and
    securing said pipes or conduits in said split-ring clamps by closing said second half circle of said pivoting clamp arm so that said first half circle and said second half circle substantially contact said outer circumference of said pipes or conduits and fastening said locking mechanism.

6. A method and system of inserting said apparatus of claim 1 onto an existing threaded rod, said method comprising:
    providing a "C" clamp, said "C" clamp comprising
        a "C' clamp body;
        an upper "C" clamp head with an upper mounting gap; and
        a lower "C" clamp head with a lower mounting gap;
        wherein said upper "C" clamp head and lower "C" clamp head distend perpendicularly in the same direction from a "C" clamp body;
    cutting said existing threaded rod, or a section of said existing threaded rod, at the location where said apparatus will be inserted, creating an upper threaded rod and a lower threaded rod;
    threading a first "C" nut onto the bottom of said upper threaded rod;
    fitting said upper mounting gap of said upper "C" clamp head over said upper threaded rod under said first "C" nut;
    threading a second "C" nut onto said bottom of said upper threaded rod and adjusting said second "C" nut so that it firmly abuts the bottom of said upper "C" clamp head, thereby securing said "C" clamp firmly to said upper threaded rod by sandwiching said upper "C" clamp head between said first "C" nut and said second "C" nut;
    fitting the top of said apparatus onto said upper threaded rod;
    threading a third "C" nut and a fourth "C" nut onto the top of said lower threaded rod;
    fitting said top of said lower threaded rod into the bottom of said apparatus;
    fitting said lower mounting gap of said lower "C" clamp head of said "C" clamp over said lower threaded rod so that said lower "C" clamp head is sandwiched between said third "C" nut and said fourth "C" nut; and
    adjusting and tightening all said nuts so that said apparatus and said "C" clamp assembly is firmly secured between said upper threaded rod and said lower threaded rod.

7. A method and system of using said apparatus of claim 1 to add a second threaded rod onto an existing threaded rod, said method comprising:
    providing a "C" clamp, said "C" clamp comprising
        a "C' clamp body;
        an upper "C" clamp head with an upper mounting gap; and
        a lower "C" clamp head with a lower mounting gap;
        wherein said upper "C" clamp head and lower "C" clamp head distend perpendicularly in the same direction from a "C" clamp body;
    threading a first "C" nut onto the bottom of said existing threaded rod;
    fitting said upper mounting gap of said upper "C" clamp head over said existing threaded rod under said first "C" nut;
    threading a second "C" nut onto said bottom of said existing threaded rod and adjusting said second "C" nut so that it firmly abuts the bottom of said upper "C" clamp head, thereby securing said "C" clamp firmly to said existing threaded rod by sandwiching said upper "C" clamp head between said first "C" nut and said second "C" nut;

fitting the top of said apparatus onto said bottom of said existing threaded rod;

threading a third "C" nut and a fourth "C" nut onto the top of said second threaded rod, which is to be added under said existing threaded rod;

fitting said top of said second threaded rod into the bottom of said apparatus;

fitting said lower mounting gap of said lower "C" clamp head of said "C" clamp over said second threaded rod so that said lower "C" clamp head is sandwiched between said third "C" nut and said fourth "C" nut; and adjusting and tightening all said nuts so that said apparatus and said "C" clamp assembly is firmly secured between said existing threaded rod and said second threaded rod.

8. An apparatus for hanging a pipe from a single threaded rod, said apparatus comprising:

an unthreaded rod coupling, said unthreaded rod coupling comprising
a body, said body comprising an elongated collar, and
a sliding cavity, which is marginally larger in diameter than the diameter of said threaded rod and which runs the length of said elongated collar; and
a split-ring clamp, said split-ring clamp comprising
a base, said base comprising a first half circle that conforms to the outer circumference of said pipe,
a pivoting clamp arm, said pivoting clamp arm comprising a second half circle that conforms to said outer circumference of said pipe,
a hinge, and
a locking mechanism,
said pivoting clamp arm being swingably connected to said base using said hinge,
said base of said split-ring clamp distending from said body of said unthreaded rod coupling,
said split-ring clamp being capable of supporting said pipe securely by substantially contacting said outer circumference of said pipe;
wherein said sliding cavity of said unthreaded rod coupling slidably fits over said threaded rod and is secured in place between two nuts threaded onto said threaded rod, allowing said apparatus to hang said pipe secured in said split-ring pipe clamp from said threaded rod.

9. The apparatus of claim 8, wherein said split ring clamp is mounted parallel to said body in order to suspend said pipe horizontally.

10. The apparatus of claim 8, wherein said split ring clamp is mounted perpendicular to said body in order to suspend said pipe vertically.

11. The apparatus of claim 8, further comprising a "C" clamp to span a gap between two said threaded rods, said "C" clamp comprising
a 'C' clamp body;
an upper "C" clamp head with an upper mounting gap; and
a lower "C" clamp head with a lower mounting gap;
wherein said upper "C" clamp head and lower "C" clamp head distend perpendicularly in the same direction from a "C" clamp body.

12. A method and system that facilitates said apparatus of claim 8, said method comprising:
suspending said threaded rod into the location where said pipe will be hung;
threading said first nut onto said threaded rod;
adjusting said first nut to the appropriate height just above the location where said apparatus will be installed;
sliding said unthreaded rod coupling of said apparatus onto said threaded rod by inserting said threaded rod through said sliding cavity and said elongated collar;
threading said second nut onto said threaded rod;
adjusting said second nut to firmly secure said apparatus between said first nut and said second nut with said split-ring clamp in the appropriate position to receive said pipe for hanging;
positioning said pipe to be hung in said first half circle of said base of said split-ring clamp; and
securing said pipe in said split-ring clamp by closing said second half circle of said pivoting clamp arm so that said first half circle and said second half circle substantially contact said outer circumference of said pipe and fastening said locking mechanism.

13. A method and system of inserting said apparatus of claim 8 onto an existing threaded rod, said method comprising:
providing a "C" clamp, said "C" clamp comprising
a "C' clamp body;
an upper "C" clamp head with an upper mounting gap; and
a lower "C" clamp head with a lower mounting gap;
wherein said upper "C" clamp head and lower "C" clamp head distend perpendicularly in the same direction from a "C" clamp body;
cutting said existing threaded rod, or a section of said existing threaded rod, at the location where said apparatus will be inserted, creating an upper threaded rod and a lower threaded rod;
threading a first "C" nut onto the bottom of said upper threaded rod;
fitting said upper mounting gap of said upper "C" clamp head over said upper threaded rod under said first "C" nut;
threading a second "C" nut onto said bottom of said upper threaded rod and adjusting said second "C" nut so that it firmly abuts the bottom of said upper "C" clamp head, thereby securing said "C" clamp firmly to said upper threaded rod by sandwiching said upper "C" clamp head between said first "C" nut and said second "C" nut;
fitting the top of said apparatus onto said upper threaded rod;
threading a third "C" nut and a fourth "C" nut onto the top of said lower threaded rod;
fitting said top of said lower threaded rod into the bottom of said apparatus;
fitting said lower mounting gap of said lower "C" clamp head of said "C" clamp over said lower threaded rod so that said lower "C" clamp head is sandwiched between said third "C" nut and said fourth "C" nut; and
adjusting and tightening all said nuts so that said apparatus and said "C" clamp assembly is firmly secured between said upper threaded rod and said lower threaded rod.

14. A method and system of using said apparatus of claim 8 to add a second threaded rod onto an existing threaded rod, said method comprising:
providing a "C" clamp, said "C" clamp comprising
a 'C' clamp body;
an upper "C" clamp head with an upper mounting gap; and
a lower "C" clamp head with a lower mounting gap;
wherein said upper "C" clamp head and lower "C" clamp head distend perpendicularly in the same direction from a "C" clamp body;

threading a first "C" nut onto the bottom of said existing threaded rod;

fitting said upper mounting gap of said upper "C" clamp head over said existing threaded rod under said first "C" nut;

threading a second "C" nut onto said bottom of said existing threaded rod and adjusting said second "C" nut so that it firmly abuts the bottom of said upper "C" clamp head, thereby securing said "C" clamp firmly to said existing threaded rod by sandwiching said upper "C" clamp head between said first "C" nut and said second "C" nut;

fitting the top of said apparatus onto said bottom of said existing threaded rod;

threading a third "C" nut and a fourth "C" nut onto the top of said second threaded rod, which is to be added under said existing threaded rod;

fitting said top of said second threaded rod into the bottom of said apparatus;

fitting said lower mounting gap of said lower "C" clamp head of said "C" clamp over said second threaded rod so that said lower "C" clamp head is sandwiched between said third "C" nut and said fourth "C" nut; and adjusting and tightening all said nuts so that said apparatus and said "C" clamp assembly is firmly secured between said existing threaded rod and said second threaded rod.

15. The apparatus of claim 8, further comprising a second split-ring clamp distending from said unthreaded rod coupling on the opposite side of said split-ring clamp.

* * * * *